Aug. 30, 1966  G. W. JACKSON ET AL  3,269,418
FLUID CONTROL VALVE

Filed July 11, 1963                    2 Sheets-Sheet 1

INVENTORS
George W. Jackson
Paul J. Long, Jr.
BY
J. C. Evans
THEIR ATTORNEY

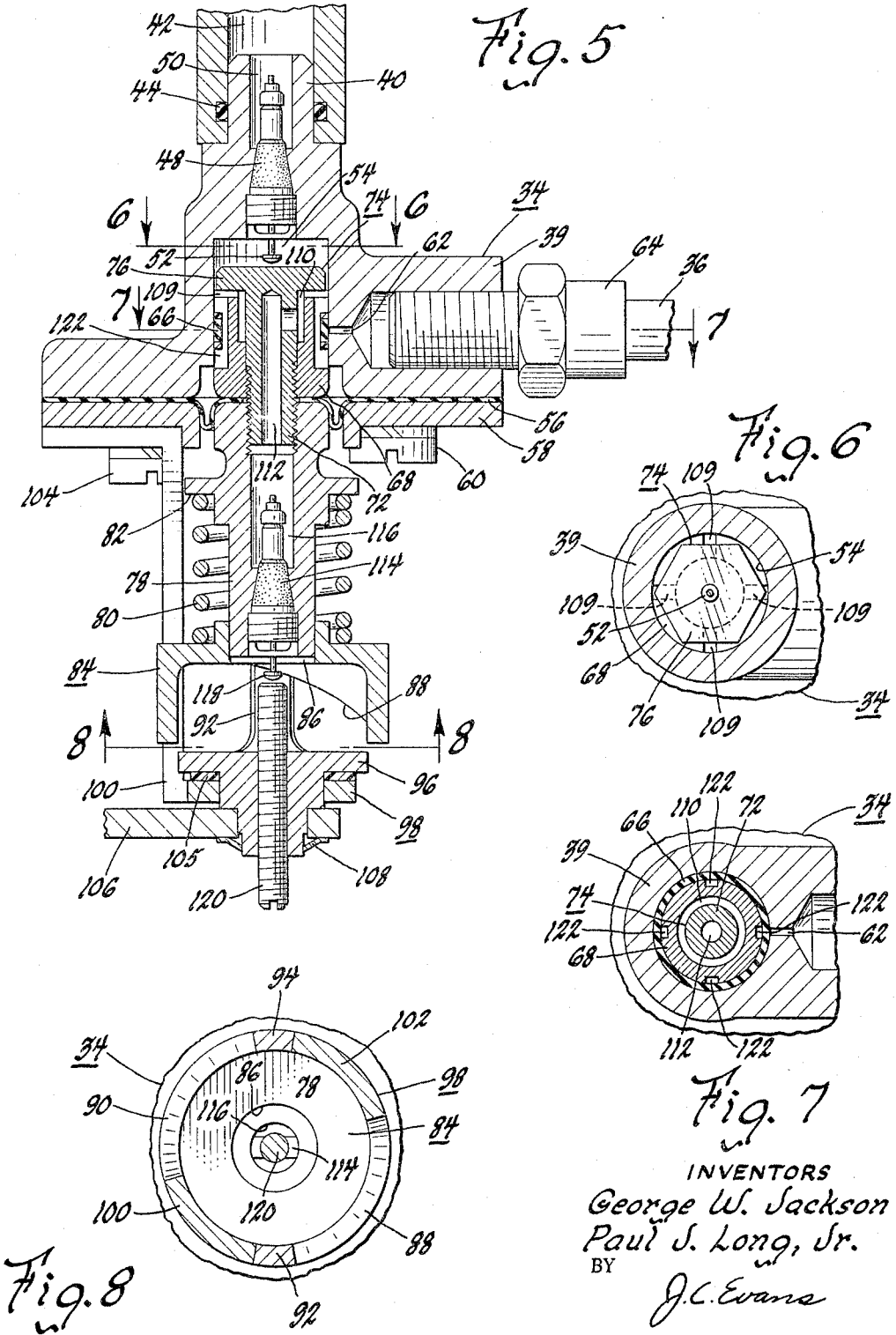

3,269,418
FLUID CONTROL VALVE

George W. Jackson and Paul J. Long, Jr., Dayton, Ohio, assignors to General Motors Corporation, Detroit, Mich., a corporation of Delaware
Filed July 11, 1963, Ser. No. 294,343
9 Claims. (Cl. 137—627.5)

This invention relates to fluid control valves and more particularly to valves for controlling air lift spring devices and the like.

An object of the present invention is to improve the responsiveness of a fluid control device for selectively communicating a pressure actuated device with a source of pressurized fluid and atmosphere by the inclusion therein of a plurality of low-cost valve means and means for progressively unbalancing and balancing pressure responsive valve actuator means for controlling the pressure build-up in the pressure actuated device.

Further objects and advantages of the present invention will be apparent from the following description, reference being had to the accompanying drawings wherein a preferred embodiment of the present invention is clearly shown.

In the drawings:

FIGURE 5 is an enlarged view in vertical section taken along the line 5—5 of FIGURE 4;

FIGURE 6 is a view in horizontal section taken along the line 6—6 of FIGURE 5;

FIGURE 7 is a view in horizontal section taken along the line 7—7 of FIGURE 5; and FIGURE 8 is a view in horizontal section taken along the line 8—8 of FIGURE 5.

Figure 1:
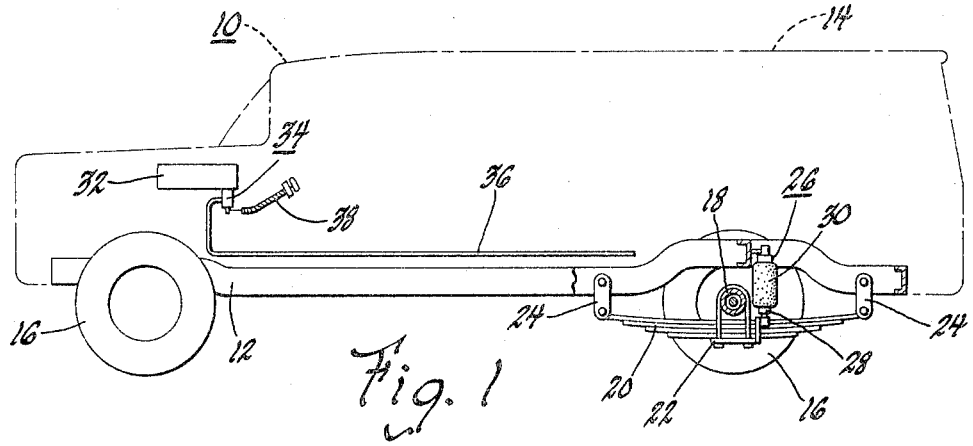
FIGURE 1 is a view in side elevation of a vehicle suspension system using the control valve of the present invention.
Figure 2:
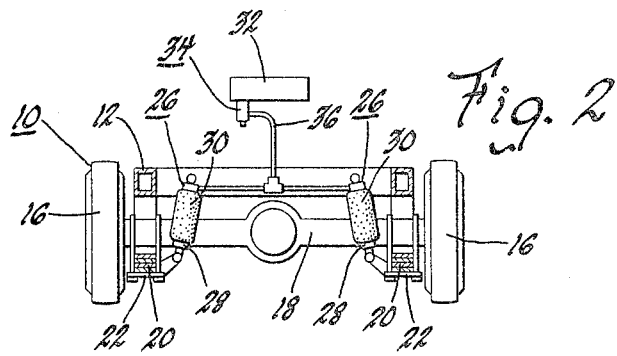
FIGURE 2 is a view in end elevation of the suspension system of FIGURE 1.
Figure 3:
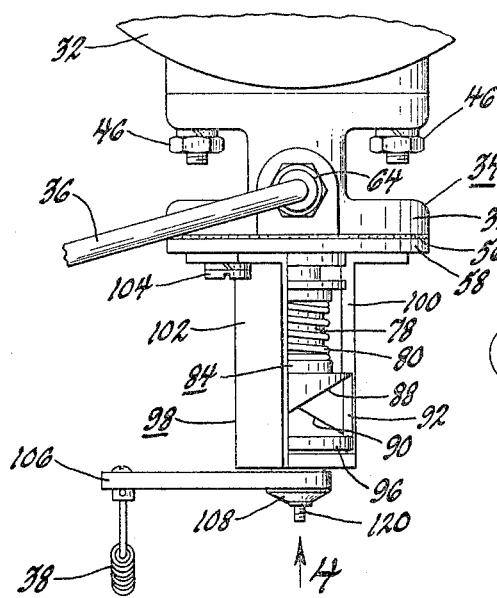
FIGURE 3 is a view in side elevation of the control valve of the present invention.
Figure 4:
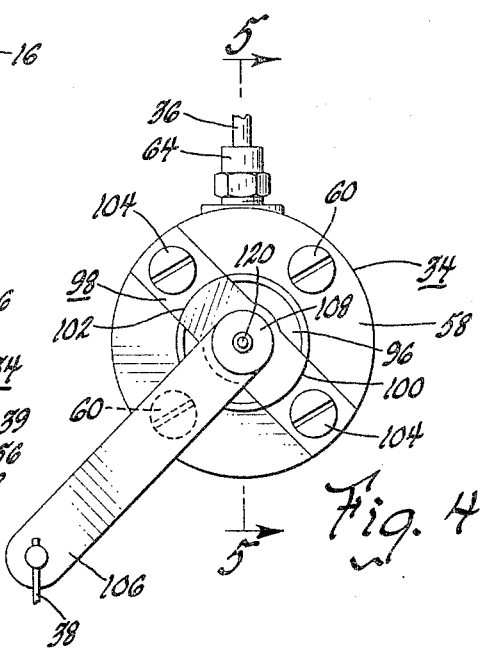
FIGURE 4 is a bottom elevational view looking in the direction of arrow 4 in FIGURE 3.

In FIGURES 1 and 2 of the drawings, a vehicle 10 is illustrated as including a sprung assembly comprising a chassis frame 12 and a body 14 supported thereon along with conventional parts normally associated therewith and further including an unsprung assembly comprising ground engaging wheels 16 supported on an axle housing 18 in a conventional manner along with the other parts normally associated with such wheels and housings.

The sprung assembly represented by the chassis frame 12 and body 14 is supported upon the unsprung assembly by means of a leaf spring 20 secured on each end of the axle housing 18 by a spring seat and U-bolt arrangement 22 along with shackle connections 24 located at either end of each of the leaf springs 20. In addition to the support of the unsprung mass afforded by the leaf springs 20, a shock absorber and air spring auxiliary suspension unit 26 is provided adjacent each of the springs 20 for supplementing the supporting action thereof. Details of a typical combination shock absorber and air spring auxiliary suspension unit 26 are more particularly set forth in the patent to Schmitz et al. 3,042,392 issued July 3, 1962, with it being understood that each of the auxiliary units 26 basically include a direct-acting hydraulic shock absorber unit 28 having an inflatable element or air spring 30 thereon of a suitable resilient material that, when inflated, will supplement the load-carrying capacity of the leaf springs 20 so as to prevent excessive engagement of bump stops on the vehicle and undue elevation of the front end of the vehicle when heavy loads are carried over the axle housing 18. The above-described structure is merely representative of a typical pressure actuated device that might be associated with the control valve of the present invention.

In the illustrated arrangement a reservoir 32 of high pressure fluid is communicated with the inflatable element 30 of the auxiliary suspension unit 26 through a control valve 34 of the present invention and conduits 36. The control valve 34 is actuated by suitable means such as a Bowden wire assembly 38 located at a readily accessible point, for example on the dashboard of the vehicle, so that the vehicle operator can quickly inflate or deflate the air springs depending upon the weight of the sprung mass.

Referring now to FIGURES 3 through 8, the improved fluid control valve 34 is illustrated as comprising a housing 39 having a tubular portion 40 thereof received in an opening 42 in the wall of the reservoir 32 with the reservoir wall supporting an O-ring element 44 in sealing engagement with the tubular portion 40 to prevent fluid leakage along the outer periphery thereof. The tubular element 40 is held within the opening 42 by suitable fastening means, for example screws 46 directed through the housing 39 into threaded engagement with the reservoir 32 on either side of the tubular portion 40.

Within the tubular portion 40 a valve structure 48, of the common tire variety, is supported, with an inlet opening 50 thereto in communication with the opening 42 and a spring biased stem actuator portion 52 thereof extending into an open-ended pressure chamber 54 located centrally of the housing 39.

The open end of the pressure chamber 54 is closed by a diaphragm element 56 that is held in sealing engagement with one end of the housing 39 by means of a plate 58 secured thereto by suitable fastening means such as screws 60.

The pressure chamber 54 communicates through a passageway 62 formed in one side of the housing 39 with the conduit 36 to a pressure actuated device such as the inflatable spring elements 30 illustrated in FIGURES 1 and 2 with the conduit 36 being threadably secured to the housing 39 by means of a fluid fitting 64. Communication between the passageway 62 and the pressure chamber 54 is opened and closed by valving means including an annular seal element 66 supported within a recess on the outer periphery of a piston 68 slidably mounted within the pressure chamber 54 having one end thereof in engagement with one side of the pressure responsive diaphragm 56 and a threaded central opening directed therethrough that threadably receives an exteriorly threaded tubular end 72 of a valve actuator element 74 having a hexagonal head portion 76 on the opposite end thereof overlying the spring biased stem 52 of the valve assembly 48. The tubular end 72 of the actuator element 74 is directed centrally through the diaphragm 56 into threaded engagement with one end of an elongated reciprocable exhaust valve core 78 that has one end thereof in engagement with the outer surface of diaphragm 56 in axial alignment with piston 68 so that the piston 68 and core 78 will bear against the diaphragm 56 on either side thereof to prevent fluid leakage from the pressure chamber 54 along the outer periphery of the tubular end 72 of the actuator element 74.

In the illustrated embodiment of the invention, the core 78 is surrounded by a coil spring 80 having one end thereof in engagement with a shoulder 82 on the core 78 and the opposite end thereof spring biased against a flat surface on a cam element 84 including a central opening 86 therein that slidably receives the free end of the core 78.

By virtue of the spring 80, diametrically opposed inclined cam surfaces 88, 90 on cam element 84 are biased into engagement with like inclined surfaces on diametrically opposed elongated cam follower legs 92, 94 secured to one end of a support element 96 that is rotatably mounted within a bight portion of a U-shaped bracket or cam guide 98 having spaced elongated arm portions 100, 102 with offset ends thereon secured to the exposed surface of plate 58 by suitable fastening means such as screws 104. The arm portions 100, 102, as best shown in FIGURE 8, fit into spaces in the cam element 84 between surfaces 88, 90 to prevent rotation of element 84 on the exhaust core 78. The support element 96 is spaced from cam guide 98 by a washer 105 and is fastened to a lever arm 106 by means of a snap ring 108 so that upon rotation of the lever arm 106 by means such as the Bowden wire assembly 38 connected on one end thereof, the cam follower legs 92, 94 will be moved across the cam surfaces 88, 90 within limits determined by the sides of the arm portions 100, 102 to move the cam element 84 axially of the core 78 for varying the spring force of spring 80.

The pressure chamber 54 in the improved valve is communicated with atmosphere through transverse slots 109 in one end of piston 68, a space 110 formed between the piston 68 and actuator element 74, a passageway 112 formed by the tubular end 72 of the actuator element 74 and a valve assembly 114 supported within the hollow interior 116 of exhaust core 78 with the valve assembly 114 being of the common bicycle tire type including a spring biased stem portion 118 actuated by means of a pin 120 directed centrally through the support element 98 in threaded engagement therewith for adjustment relative thereto.

In accordance with certain of the principles of the present invention, the above-described embodiment of the invention operates to infinitely vary the pressure acting on a pressure actuated device between a substantially deflated pressure to a maximum pressure determined by that of the pressure source connected to the control valve by the conduit 36. More particularly, in the illustrated embodiment, when the lever 106 is adjusted by the Bowden wire assembly 38 into a low-pressure position illustrated in FIGURE 4, the cam follower legs 92, 94 will engage the sides of the cam guide arm portions 100, 102 as illustrated in FIGURE 8 so that the inclined surfaces thereon contact the lowest portion of the inclined cam surfaces 88, 90, respectively.

When the improved control valve is in its low position, the cam element 84 and exhaust core shoulder 82 are held apart by the spring 80 in the position shown in FIGURE 5 and the spring force acts through the exhaust core 78 and diaphragm 56 against any residual pressure in chamber 54 to position the valve actuator element 74 and the piston 68 in the outlet passageway 62 and the hexagonal head 76 of the actuator element 74 is spaced from the stem 52 of the inlet valve assembly 48. In one arrangement, the above-mentioned equilibrium position is maintained by a pressure in the range of 10–12 p.s.i.g. in the pressure chamber so as to prevent a complete collapse of an inflatable element associated therewith such as the inflatable element of an air spring mechanism or the like.

Pressurized fluid flow is passed through the inlet valve assembly 48, the pressure chamber 54, slots 109 in the end of piston 66, axial passageways 122 in the outer periphery of piston 68 and the outlet passageway 62 so as to inflate the air spring by moving the lever 106 into a first position wherein the cam follower legs 92, 94 are shifted to a higher point on cam surfaces 88, 90. This causes the cam element 84 to slide on the outer periphery of exhaust core 78 toward the shoulder 82 thereon to thereby compress the coil spring 80 and increase the spring force thereof to cause an unbalanced force across the diaphragm 56 which shifts the actuator element 74 into the chamber 54 where it depresses the inlet valve stem 52 to allow pressurized fluid to flow into the pressure chamber 54. The shifting of the actuator element 74 also moves the piston 68 so that the seal element 66 no longer closes the outlet passageway 62 and the pressurized fluid in chamber 54 will pass through slots 109, passageways 122 and 62 to inflate the pressure actuated device, in this case the inflatable portion of the air spring mechanism. Following a predetermined pressure increase in the pressure chamber 54, the fluid pressure acting on the diaphragm 56 will cause it to quickly respond to balance the additional spring force of the coil spring 80 produced by movement of the follower arms 92, 94 to higher points on cam surfaces 88, 90. This causes an abrupt return of the piston 68 and actuator element 74 to an equilibrium position wherein the inlet valve assembly 48 is closed and the seal element 66 closes the outlet passageway 62. It will be appreciated that the pressures in the chamber 54 can be infinitely controlled between limits determined by the camming characteristics of the surfaces 88, 90 which, in cooperation with spring 80, produce increased spring forces on the diaphragm 56 as the cam follower arms 92, 94 are moved from the low point thereon toward the high point thereof.

Once the vehicle loading has been returned to normal, the operator of the vehicle, in order to avoid raising the rear of the vehicle to too great a degree because of the additive spring support effects of the air spring suspension unit 26 and the springs 22, can deflate the air spring mechanism by returning the lever 106 to the low position. When the lever 106 is in the low position, the cam follower arms 92, 94 are again in the position illustrated in FIGURE 8. Movement of the lever 106 into the low position reduces the spring force acting on the diaphragm 56 and the fluid pressure in the chamber 54 will cause the diaphragm 56 to rapidly shift the valve actuator 74 and piston 68 out of the chamber 54 and thereby move the sealing element 66 away from the outlet port 62. The diaphragm 56 also shifts the core 78 into the cam element 84 until the stem 118 is depressed by the pin 120 whereby pressurized fluid flows from the conduit 36 through the outlet passageway 62, into the chamber 54 and thence through the slots 109, space 110, the passageway 112 into the hollow interior 116 of the exhaust core 78 and thence through the exhaust valve assembly 114 to atmosphere. Once the pressure in the chamber 54 has been substantially exhausted, the forces acting on the diaphragm 56 are again balanced so that it will move the piston 68 into its equilibrium position where the seal element 66 will close the passageway 62 and the valves 48 and 114 will be closed.

While the embodiment of the present invention as herein disclosed constitutes a preferred form, it is to be understood that other forms might be adopted.

What is claimed is as follows:

1. In a fluid control device the combination of, valve body means forming first and second passageway means and a pressure chamber communicating therewith, first valve means for controlling communication between said first passageway means and said pressure chamber, second valve means for controlling communication between said second passageway means and said pressure chamber, pressure responsive means including a piston member for actuating said first and second valve means, said second valve means including an annular seal supported within said piston member for movement therewith, means for unbalancing said pressure responsive means to open said first and second valve means, said pressure responsive means being balanced upon the occurrence of a predetermined pressure in said pressure chamber to close said first and second valve means so as to block communication between said pressure chamber and said first and second passageway means, said piston member including a passageway therethrough communicating said pressure chamber with the exterior of said valve body means.

2. In a fluid control device the combination of, valve body means forming first and second passageway means and a pressure chamber communicating therewith, first valve means for blocking communication between said first passageway and said pressure chamber, second valve means for controlling communication between said second passageway means and the pressure chamber, pressure responsive means including a piston member for actuating said first and second valve means, said second valve means including an annular seal supported within said piston member for movement therewith, means including said pressure chamber for progressively unbalancing and balancing said pressure responsive means to cause it to actuate said first and second valve means to allow flow of fluid between said first and second passageway means at progressively increasing pressures, said piston member including a passageway therethrough communicating said pressure chamber with the exterior of said valve body means.

3. In a fluid control device the combination of, valve body means forming first and second passageway means and a pressure chamber communicating therewith, first valve means for blocking communication between said first passageway means and said pressure chamber, second valve means for controlling communication between said second passageway means and said pressure chamber, pressure responsive means for actuating said first and second valve means, balance means including said pressure chamber for maintaining said pressure responsive means in a predetermined equilibrium position wherein said first and second valve means block communication between said pressure chamber and said first and second passageway means, actuatable means for varying the effect of said balance means for shifting said pressure responsive means into a first predetermined unbalanced position wherin said first and second valve means communicate said first and second passageway means with said pressure chamber to allow flow of pressurized fluid from said first passageway means to said second passageway means, said pressure responsive means being returned to its equilibrium position upon the occurrence of a predetermined pressure in said pressure chamber.

4. In a fluid control device the combination of, valve body means forming first and second passageway means and a pressure chamber communicating therewith, first valve means for controlling communcation between said first passageway means and said pressure chamber, second valve means for controlling communication between said second passageway means and said pressure chamber, pressure responsive means for actuating said first and second valve means, balance means including said pressure chamber for maintaining said pressure responsive means, in an equilibrium position wherein said first and second valve means block communication between said first and second passageway means and said pressure chamber, actuatable means for varying the effect of said balance means for shifting said pressure responsive means into a first unbalanced position to cause said first and second valve means to communicate said first and second passageway means with said pressure chamber to allow flow of pressurized fluid between said first passageway means and said second passageway means, third valve means for exhausting pressurized fluid from said pressure chamber, said actuatable means including means for varying the effect of said balance means for shifting said pressure responsive means into a second unbalanced position wherein said first valve is closed and said second and third valve means are opened to allow flow of pressurized fluid from said second passageway means to atmosphere.

5. In a fluid control device the combination of, valve body means forming first and second fluid passageways and a pressure chamber communicating therewith, first valve means supported by said body means for controlling concentration between said first passageway means and said pressure chamber, second valve means for controlling communication between said second passageway means and said pressure chamber, pressure responsive means for actuating said first and second valve means, balance means including said pressure chamber for maintaining said pressure responsive means in a predetermined equilibrium wherein said first and second valve means block communication between said first and second passageway means and said pressure chamber, actuatable means conditioning said balance means for selectively unbalancing said pressure responsive means in a first direction for shifting it from said predetermined equilibrium position to a first unbalanced position wherein said first and second valve means communicate said first and second passageway means with said pressure chamber to allow flow of pressurized fluid from said first passageway means to said second passageway means, said pressure responsive means responding to increased pressure in said pressure chamber to return to its equilibrium position when a predetermined pressure build-up in said pressure chamber occurs to overcome said selected unbalance, third valve means for exhausting pressurized fluid from said pressure chamber, said actuatable means including means for further affecting the action of said balance means to unbalance said pressure responsive means in a second direction for causing it to shift to a second unbalanced position wherein said third valve means communicates said pressure chamber with atmosphere and said second valve means communicates said second pasageway means with said pressure chamber for allowing pressurized fluid flow to flow therefrom to atmosphere.

6. In a fluid control device the combination of, valve body means forming first and second passageway means, movable pressure responsive means cooperating with said valve body means for forming a pressure chamber communicating with said first and second fluid passageway means, first valve means for controlling communication between said first passageway means and said pressure chamber, a valve actuator element having one end thereof secured to said pressure responsive means for movement therewith, a valve support element secured to said actuator element for movement therewith, second valve means carried by said support element controlling communication between said second passageway means and said pressure chamber, means including a resilient element for biasing said pressure responsive means against pressure in said pressure chamber for maintaining said actuator element and said valve support element in an equilibrium position wherein said first and second valve means block communication between said first and second passageway means and said pressure chamber, and actuatable means for changing the biasing force of said resilient element to cause an unbalanced force across said pressure responsive means for shifting it in a first direction along with said actuator element and valve support element to open said first valve means while conditioning said second valve means to allow flow of pressurized fluid from said first passageway means to said second passageway means, said pressure responsive means responding to an increase in pressure within said pressure chamber to cause said actuator element and said valve support element to return to their equilibrium position for blocking communication between said first and second passageway means and said pressure chamber.

7. In the fluid control device of claim 6, said actuatable means including means for preselecting the change in the biasing force of said resilient element so as to produce a predetermined desired pressure increase in said pressure chamber.

8. In the fluid control device of claim 6, said actuatable means being reversible to produce a reversely unbalanced force across said pressure responsive means causing movement thereof in a second direction to close said first valve means and open said second valve means, and third valve means communicating said pressure chamber with atmosphere upon movement of said pressure responsive means in said second direction to allow flow of pressurized fluid from said second passageway means to atmosphere.

9. In a fluid control valve the combination of, valve body means forming first and second fluid passageway means, diaphragm means cooperating with said valve body means for forming a pressure chamber communicating with said first and second fluid passageway means, first valve means for controlling communication between said first passageway means and said pressure chamber, a tubular element having one end thereof engaging said diaphragm means on the outside surface thereof for movement therewith, a valve actuator element inserted within said tubular element having passageway means therein intercommunicating said pressure chamber and the interior of said tubular element, a valve seal support element secured to said actuator means for movement therewith, valve seal means carried by said support element for opening and closing communication between said second passageway means and said pressure chamber, means including a resilient element for biasing said tubular element in a first direction against said diaphragm means for maintaining said valve actuator element and said valve seal element in an equilibrium position wherein said first and second passageway means are blocked from said pressure chamber, an actuatable element slidably mounted on the opposite end of said tubular element in axial abutment with said resilient means, means for moving said actuatable element in a first direction relative to said tubular element for increasing the biasing force of said resilient element to cause an unbalanced force across said diaphragm means for shifting said valve actuator element and said valve seal element to a first position for communicating said first and second passageway means with said pressure chamber, said diaphragm means responding to an increase in pressure within said pressure chamber to cause said valve actuator element and said valve seal element to return to their equilibrium position for blocking communication between said first and second passageway means and said pressure chamber, means for shifting said actuatable element in a second direction relative to said tubular element to reduce the biasing action of said resilient element to shift said valve actuator element and said valve seal element to open communication between said second passageway means and said pressure chamber and close communication to said first passageway means, third valve means supported within said tubular element for opening and closing communication between the interior thereof and atmosphere, and means for conditioning said third valve means to communicate said pressure chamber with atmosphere upon the shifting of said actuatable element in the second direction whereby pressurized fluid flow passes from said second passageway means to atmosphere.

References Cited by the Examiner
UNITED STATES PATENTS
3,152,607   10/1964   Lundeen _ _ _ _ _ _ 137—614.11 X WILLIAM F. O'DEA, *Primary Examiner.*

CLARENCE R. GORDON, *Examiner.*